United States Patent [19]

McManis

[11] Patent Number: 5,692,047

[45] Date of Patent: Nov. 25, 1997

[54] SYSTEM AND METHOD FOR EXECUTING VERIFIABLE PROGRAMS WITH FACILITY FOR USING NON-VERIFIABLE PROGRAMS FROM TRUSTED SOURCES

[75] Inventor: Charles E. McManis, Sunnyvale, Calif.

[73] Assignee: Sun Microsystems, Inc., Mountain View, Calif.

[21] Appl. No.: 569,398

[22] Filed: Dec. 8, 1995

[51] Int. Cl.⁶ ................................................. G06F 9/44
[52] U.S. Cl. ................ 380/4; 364/DIG. 1; 364/280.4; 364/286.4; 364/DIG. 2; 364/946; 364/949.96; 395/704; 395/186
[58] Field of Search .................. 380/4, 25; 364/280.4, 364/286.4, 946, 949.96; 395/704, 186

[56] References Cited

U.S. PATENT DOCUMENTS

| | | | |
|---|---|---|---|
| 4,926,476 | 5/1990 | Covey | 380/4 |
| 5,224,160 | 6/1993 | Paulini et al. | 380/4 |
| 5,421,006 | 5/1995 | Jablon et al. | 380/4 X |
| 5,475,753 | 12/1995 | Barbara et al. | 380/4 |
| 5,479,509 | 12/1995 | Ugon | 380/4 X |
| 5,504,814 | 4/1996 | Miyahara | 380/4 |
| 5,559,884 | 9/1996 | Davidson et al. | 380/4 |

*Primary Examiner*—Gilberto Barrón, Jr.
*Attorney, Agent, or Firm*—Gary S. Williams; Flehr Hohbach Test Albritton & Herbert LLP

[57] ABSTRACT

A computer system includes a program executer that executes verifiable architecture neutral programs and a class loader that prohibits the loading and execution of non-verifiable programs unless (A) the non-verifiable program resides in a trusted repository of such programs, or (B) the non-verifiable program is indirectly verifiable by way of a digital signature on the non-verifiable program that proves the program was produced by a trusted source. In the preferred embodiment, verifiable architecture neutral programs are Java bytecode programs whose integrity is verified using a Java bytecode program verifier. The non-verifiable programs are generally architecture specific compiled programs generated with the assistance of a compiler. Each architecture specific program typically includes two signatures, including one by the compiling party and one by the compiler. Each digital signature includes a signing party identifier and an encrypted message. The encrypted message includes a message generated by a predefined procedure, and is encrypted using a private encryption key associated with the signing party. A digital signature verifier used by the class loader includes logic for processing each digital signature by obtaining a public key associated with the signing party, decrypting the encrypted message of the digital signature with that public key so as generate a decrypted message, generating a test message by executing the predefined procedure on the architecture specific program associated with the digital signature, comparing the test message with the decrypted message, and issuing a failure signal if the decrypted message digest and test message digest do not match.

21 Claims, 3 Drawing Sheets

SYSTEM AND METHOD FOR EXECUTING VERIFIABLE PROGRAMS WITH FACILITY FOR USING NON-VERIFIABLE PROGRAMS FROM TRUSTED SOURCES

The present invention relates generally to distributed computer systems, and particularly to a system and method in which a program interpreter for programs whose integrity is verifiable includes a facility for using non-verifiable programs from trusted sources and for refusing to executed other non-verifiable programs.

BACKGROUND OF THE INVENTION

The term "architecture" is defined for the purposes of this document to mean the operating characteristics of a family of computer models. Examples of distinct architectures are: Macintosh computers, IBM PC compatible computers using the DOS or Windows operating systems, SUN Microsystems computers running the Solaris operating system, and computer systems using the Unix operating system.

The term "architecture neutral" is defined for the purposes of this document to refer to ability of certain programs, such as programs written in the Java (a trademark of Sun Microsystems, Inc.) language, to be executed on a variety of computer platforms using a number of different computer architectures.

The term "architecture specific" is defined for the purposes of this document to refer to requirement that certain programs to be executed only on computer platforms using a single computer architecture. For instance, object code programs written in the 80486 assembler language can only be executed on computers using the IBM PC compatible computer architecture (as well as in other computers that contains IBM PC compatible computer emulators).

Important features of architecture neutral programs (ANPrograms) include the architecture independence of programs written in the architecture neutral language (ANLanguage). For example, Java bytecode programs can be executed on any computer platform having a Java bytecode interpreter. An additional important feature of Java bytecode programs is that their integrity can be directly verified prior to execution by a Java bytecode verifier. A Java bytecode verifier determines whether the program conforms to predefined integrity criteria. Such criteria include operand stack and data type usage restrictions that ensure that Java bytecode programs cannot overflow or underflow the executing computere's operarid stack and that all program instructions utilize only data of known data types. As a result, a Java bytecode program cannot create object pointers and generally cannot access system resources other than those which the user has explicitly granted it permission to use.

Unfortunately, distributing executable programs in an ANLanguage causes the ANProgram to run less efficiently than it would if it could take advantage of architecture specific features. For example, Java bytecode programs executed by a Java bytecode interpreter typically run 2.5 to 5 times as slow as the equivalent architecture specific programs (ASPrograms) compiled in corresponding architecture specific languages (ASLanguages). While a factor of five speed reduction is actually considered to be unusually good for an ANProgram executer (i.e., interpreter), it is a sufficient loss of efficiency that some users will require or insist upon the ability to use equivalent programs compiled in an ASLanguage.

Compilers that can compile an ANProgram into an equivalent ASProgram can be written. However, they may be prohibitively expensive for the end user. In addition, the integrity of the equivalent compiled ASProgram cannot be verified directly from the compiled ASProgram code by an ANProgram integrity verifier. Thus, in the case of Java bytecode programs, the use of ANPrograms compiled into equivalent ASPrograms potentially results in the loss of one of the most valuable features of an ANLanguage.

However, there are some legitimate (or legal) tasks that can be performed by integrity non-verifiable ASPrograms but which cannot be performed by integrity verifiable ANPrograms. These include tasks that would otherwise violate the operand stack and data type usage restrictions imposed on the integrity verifiable ANPrograms. In addition, such ASPrograms can be executed much faster than ANPrograms. As a result, there are number of reasons why it is desirable to have a computer system that is designed to primarily execute integrity verifiable ANPrograms but also has the capability of executing integrity non-verifiable ASPrograms.

Although compilation of ANProgrmms by a third party is possible, such compilations require that the third party be authenticated. That is, it must be possible to verify from the information in the compiled ASProgram that it was compiled by a specific trusted third party. Even better, it should also be possible to authenticate that the compiled ASProgram was generated by a specific trusted compiler. And, since the integrity of the compiled ASProgram with respect to predefined integrity criteria cannot be directly verified, the compiled ASProgram should include information that in a verifiable manner identifies the corresponding ANProgram from which it was compiled and the ASLanguage in which it was compiled.

Thus, it is an object of the present invention to provide an ANProgram compiler and compilation method that enables the user of an ASProgram compiled from a corresponding ANProgram to authenticate the identify of who compiled the ANProgram, the identity of the corresponding ANProgram, and the ASLanguage in which the ASProgram was compiled.

It is another object of the present invention to provide an ANProgrem executer and execution method that enables integrity verifiable ANPrograms being executed to call integrity non-verifiable ASPrograms that are trusted or that have verifiable sources and compilation information so that essentially all legitimate tasks can be performed, while preventing from being called ASPrograms whose sources, compilation information, and integrity cannot be verified.

SUMMARY OF THE INVENTION

In summary, the present invention is a program executer that executes verifiable architecture neutral programs, and a class loader that prohibits the loading and execution of non-verifiable programs unless (A) the non-verifiable program resides in a trusted repository of such programs, or (B) the non-verifiable program is indirectly verifiable by way of a digital signature on the non-verifiable program that proves the program was produced by a trusted source.

In the preferred embodiment, each verifiable program is an architecture neutral program embodied in an object class having a digital signature that includes a message digest uniquely associated with that program.

Non-verifiable programs are embodied in object classes that contain a keyword indicating that the program (called a method) is not a verifiable program. In the preferred embodiment the non-verifiable programs are generally architecture specific compiled program generated with the assistance of a compiler. Each such object class includes:

the compiled, architecture specific code;

if there is a corresponding architecture neutral program (which sometimes there is not), information identifying the corresponding architecture neutral program, including a copy of the message digest of the corresponding architecture neutral program;

a digital signature by the trusted "compiling party" that generated the object class (e.g., by performing a compilation of a source program), signed using the compiling party's private encryption key; and if the code in the object class was generated by a compiler, a digital signature by the compiler itself, signed using the compiler's private encryption key.

A generally available, trusted repository of public encryption keys, sometimes called a naming service, holds the public keys for the compiler and the trusted compiling party. Using these public encryption keys all recipients of the object classes having non-verifiable programs can decrypt the digital signatures in the object class to verify that the object class was created by a trusted party, to verify that the non-verifiable program code in the object class was generated by the indicated compiler (if any), and also to verify the identity of the corresponding architecture neutral program (if any). Optionally, when the non-verifiable program code in the object class has a corresponding verifiable program, the potential user of the object class can use the program verifier to verify the proper operation of the corresponding verifiable program prior to executing the non-verifiable program code in the object class.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
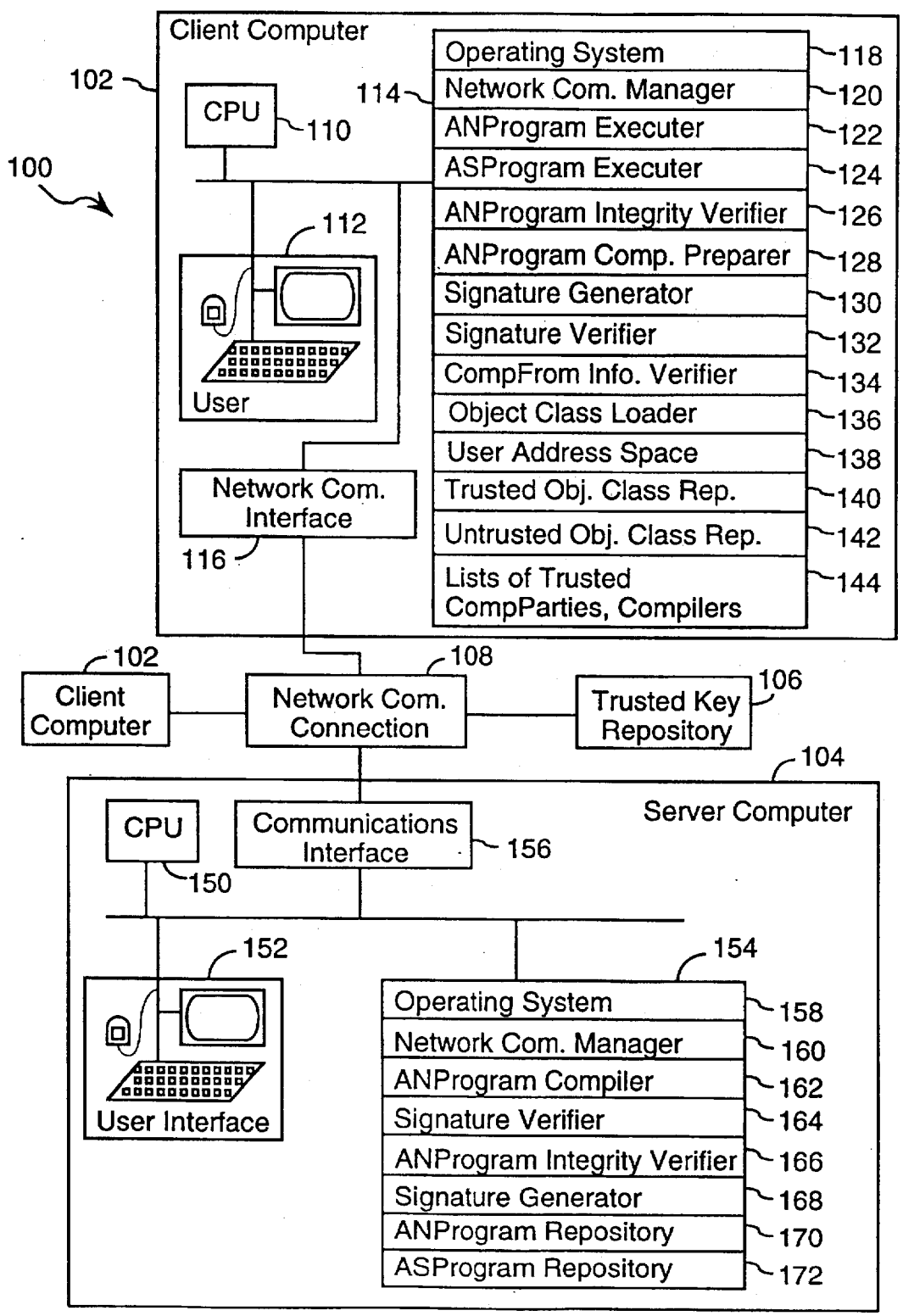
FIG. 1 is a block diagram of a distributed computer system incorporating a preferred embodiment of the present invention.

Referring to FIG. 1, there is shown a computer network 100 having many client computers 102, a server computer 104, and a trusted key repository 106. The client computers 102 are connected to each other and the server computer 104 and the trusted key repository 106 via a network communications connection 108. The network communications connection may be a local or wide area network, the Internet, a combination of such networks, or some other type of network communications connection.

While most of the client computers 102 are desktop computers, such as Sun workstations, IBM compatible computers, and Macintosh computers, virtually any type of computer could be a client computer. Each of these client computers includes a CPU 110, a user interface 112, a memory 114, and a network communications interface 116.

The network communications interface enables the client computers to communicate with each other, the sewer computer 104, and the trusted key repository 108 via the network communications connection 106.

The memory 114 of each client computer 102 stores an operating system 118, a network communications manager 120, an ANProgram (architecture neutral program) executer 122, an ASProgram (architecture specific program) executer 124, and ANProgram integrity verifier 126, an ANProgram compiling preparer 128, a signature generator 130, a signature verifier 132, a compiling information (CompInfo) verifier 134, an object class loader 136, a user address space 138, a trusted object class repository 140, an untrusted object class repository 142, and lists 144 of known, trusted compiling parties and trusted compilers. The operating system is run on the CPU 110 and controls and coordinates running the programs 120–136 on the CPU in response to commands issued by a user with the user interface 112.

The ANProgram executer 122 of each client computer 102 executes ANPrograms in the object classes stored in the trusted and untrusted object class repositories 140 and 142. Moreover, the ANPrograms are written in an ANLanguage for which the user may establish predefined integrity criteria, such as stack and data usage restrictions, so that the ANPrograms will not perform illegal tasks. Thus, the integrity of the ANPrograms can be directly verified by the ANProgram integrity verifier 126 prior to execution by determining if the program satisfies the predefined integrity criteria. These ANPrograms are therefore considered integrity verifiable ANPrograms.

In the preferred embodiment, the integrity verifiable ANPrograms are written in the Java bytecode language. Moreover, the ANProgram executer 122 and the ANProgram verifier 124 are respectively a Java bytecode program interpreter and a Java bytecode program verifier that respectively execute and verify the Java bytecode programs. The Java bytecode verifier and interpreter are products of Sun Microsystems, Inc.

However, each client computer 102 has an associated specific architecture for which programs may be written in a corresponding ASLanguage and executed by the ASProgram executer 122. The ASLanguage does not require that ASPrograms written in the ASLanguage satisfy the predefined integrity criteria of the ANLanguage. As a result, the ASPrograms can perform tasks that cannot be performed by the ANPrograms because they are not burdened by the restrictions imposed by the predefined integrity criteria of the ANLanguage. Unfortunately, however, this also means that their integrity cannot be directly verified by the ANProgram integrity verifier 126 and are therefore considered integrity non-verifiable.

Nevertheless, as indicated eadier, an ANProgram runs less efficiently than the same program compiled in an ASLanguage. Thus, the user of a client computer 102 may wish to have an ANProgram compiled by the server computer 104 for the ASLanguage associated with the user's client computer so the compiled ASProgram can be executed there by the ASProgram executer 124. Or, the user may wish to have the ANProgram compiled for the ASLanguages associated with other client computers if the compiled ASPrograms are going to be distributed and executed by the ASProgram executers 124 of other client computers.

Preparing an Architecture Neutral Program for Compiling

Figure 2:
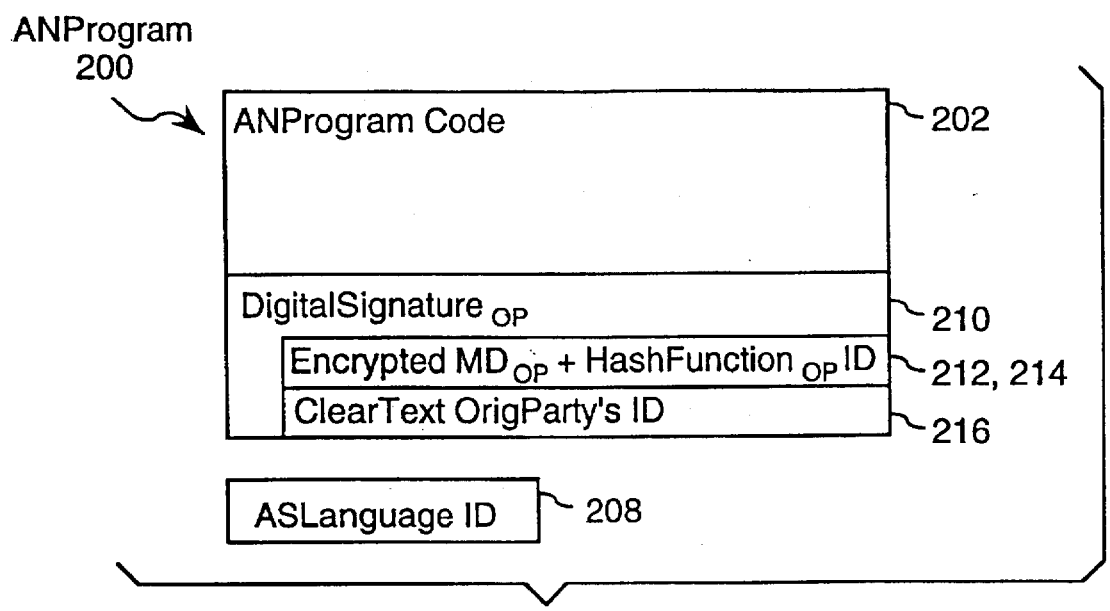
FIG. 2 depicts the structure of an architecture neutral program in accordance with a preferred embodiment of the present invention.

Referring to FIGS. 1 and 2, when an originating party (OrigParty) wishes to have an ANProgram 200 compiled by the server computer 104, the OrigParty issues a command with the user interface 112 to invoke the ANProgram compiling preparer 128 and instruct it to prepare the ANProgram for compiling. The ANProgram may be in an object class contained in one of the trusted or untrusted object class repositories 140 or 142. Table 1 contains a pseudocode representation of the procedure used by the ANProgram compiling preparer 128 to prepare the ANProgram for compiling by the server computer 104. The pseudocode used in Tables 1–3 uses universal computer language conventions. While the pseudocode employed here has been invented solely for the purposes of this description, it is designed to be easily understandable by any computer programmer skilled in the art.

Referring to FIGS. 1 and 2 and Table 1, the ANProgram compiling preparer 128 first calls the ANProgram integrity verifier 126 and instructs it to verify the integrity of the ANProgram code 202 of the ANProgram 200. This is done to make sure that the ANProgram code satisfies the predefined integrity criteria of the ANLanguage prior to being sent to the server computer 104 for compiling. If the ANProgram code does not satisfy the predefined integrity criteria, the ANProgram integrity verifier sends back a failed result to the ANProgram compiling preparer. In response, the ANProgram compiling preparer aborts the compiling preparation procedure and generates an appropriate message indicating this.

However, if the ANProgram code 202 does satisfy the predefined integrity criteria, then the ANProgram integrity verifier 126 sends back a passed result to the ANProgram compiling preparer 128. The ANProgram compiling preparer then calls the signature generator 130 and instructs it to generate the OrigParty's digital signature (DigitalSignature$_{OP}$) 210 that can be verified to ensure that the ANProgram 200 was generated by the trusted OrigParty. The signature generator generates the DigitalSignature$_{OP}$ by first generating a message digest (MD$_{OP}$) 212 of the ANProgram code 202. It does this by computing a hash function, HashFunction$_{OP}$, on the data bits of the ANProgram code. The hash function used may be either a predetermined hash function or one selected by the OrigParty. For purposes of this document, the HashFunction$_{OP}$ corresponds to the OrigParty since it was used for the DigitalSignature$_{OP}$ of the OrigParty.

The signature generator 130 then encrypts the generated massage digest (MD$_{OP}$) 212 and the ID of the HashFunction$_{OP}$ (HashFunction$_{OP}$ ID) 214 with the private encryption key of the OrigParty (OrigParty's PrivateKey). The signature generator then adds the OrigParty's ID 216 in clear text at the end of the encrypted items 212 and 214 to form the DigitalSignature$_{OP}$. The OrigParty's PrivateKey and ID are provided by the OrigParty with the user interface 112.

After the DigitalSignature$_{OP}$ 210 is generated, the ANProgram compiling preparer 128 appends it to the ANProgram code 202. Then, the ANProgram compiling preparer generates a message that the ANProgram 200 has been prepared for compiling by the server computer 104.

The OrigParty then issues with the user interface 112 a command to the network communications manager 120 to transmit the ANProgram 200 to the server computer 104, along with arguments specifying the architecture specific language into which the program is to be compiled (ASLanguage ID) and the compiler to be used (Compiler ID). The network communications manager retrieves the ANProgram from the trusted or untrusted object class repository 140 or 142 in which it is located and provides it to the network communications interface 116. The network communications manager then instructs the network communications interface to transmit the ANProgram to the server computer along with the specific arguments.

Compiling an Architecture Neutral Program

The transmitted ANProgram 200 is then received at the server computer 104. The server computer includes a CPU 150, a user interface 152, a memory 154, and a network communications interface 156. The network communications interface enables the server computer to communicate with the client computers 102 and the trusted key repository 106 via the network communications connection 108.

The memory 154 of the server computer 104 stores an OPerating system 158, a network communications manager 160, an ANProgram compiler 162, a signature verifier 164, an ANProgram integrity verifier 166, a signature generator 168, an ANProgram repository 170, and an ASProgram repository 172. The OPerating system is run on the CPU 150 and controls and coordinates running the programs 160–168 on the CPU in response to commands issued by a compiling party (CompParty) with the user interface 152.

The network communications interface 156 receives the ANProgram 200 and instructs the network communications manager 160 that this has occurred. In response, network communications manager places the received ANProgram in the ANProgram repository 170. It the server 104 is set up as an automatic compiler service, this is done automatically by the network communications manager 160. Otherwise, the ANProgram is moved into repository 170 by the network communications manager when the CompParty issues a command with the user interface.

Then, either automatically, or upon the issuance of a command by the CompParty with the user interface 252, the ANProgram compiler 162 is invoked to compile the ANProgram 200. Table 2 contains a pseudocode representation of the compilation procedure used by the ANProgram compiler to compile the ANProgram.

Referring to FIGS. 1–2 and Table 2, the ANProgram compiler 162 first calls the signature verifier 164 to verify the DigitalSignature$_{OP}$210 in the received ANProgram 200 so as to establish that the DigitalSignature$_{OP}$210 is actually the originating party's signature for the ANProgram (e.g., as OPposed to being a forged signature or the OrigParty signature on some other version of the ANProgram). In particular, the signature verifier uses the ClearText OrigParty's ID 216 in the received ANProgram to obtain the OrigParty's PublicKey from the trusted key repository 106. Then the signature verifier decrypts the encrypted MD$_{OP}$212 and HashFunction$_{OP}$ID 214 in the DigitalSignature$_{OP}$ using the public encryption key of the OrigParty (OrigParty's PublicKey).

Next, the signature verifier 164 generates a test message digest (TestMD$_{OP}$), which should match the decrypted MD$_{OP}$212, by computing the corresponding HashFunction$_{OP}$ on the ANProgram code 202 of the received ANProgram 200. The HashFunction$_{OP}$ID 214 in the decrypted DigitalSignature$_{OP}$ is used to identify the proper HashFunction$_{OP}$ to be used. The decrypted MD$_{OP}$ and the generated TestMD$_{OP}$ are then compared to verify the DigitalSignature$_{OP}$210.

If the MD$_{OP}$212 and the TestMD$_{OP}$ do not match, then the signature verifier 162 sends back a failed result to the ANProgram compiler 162. In response, the ANProgram compiler aborts the compiling procedure and generates an apprOPriate message.

On the other hand, if the $MD_{OP}$ and the $TestMD_{OP}$ do match, then the signature verifier 162 sends back a passed result to the ANProgram compiler 162 and the ANProgram compiler calls the ANProgram integrity verifier 166. It instructs the ANProgram integrity verifier to verify the integrity of the ANProgram code 202 of the received ANProgram 200. This is done in the same manner and for the same purpose as was described earlier in the section discussing preparing the ANProgram for compiling. Thus, if the ANProgram code does not satisfy the predefined integrity criteria, the ANProgram integrity verifier sends back a failed result to the ANProgram compiler. In response, the ANProgram compiler aborts the compiling procedure and generates an apprOPriate message indicating this.

Figure 3:
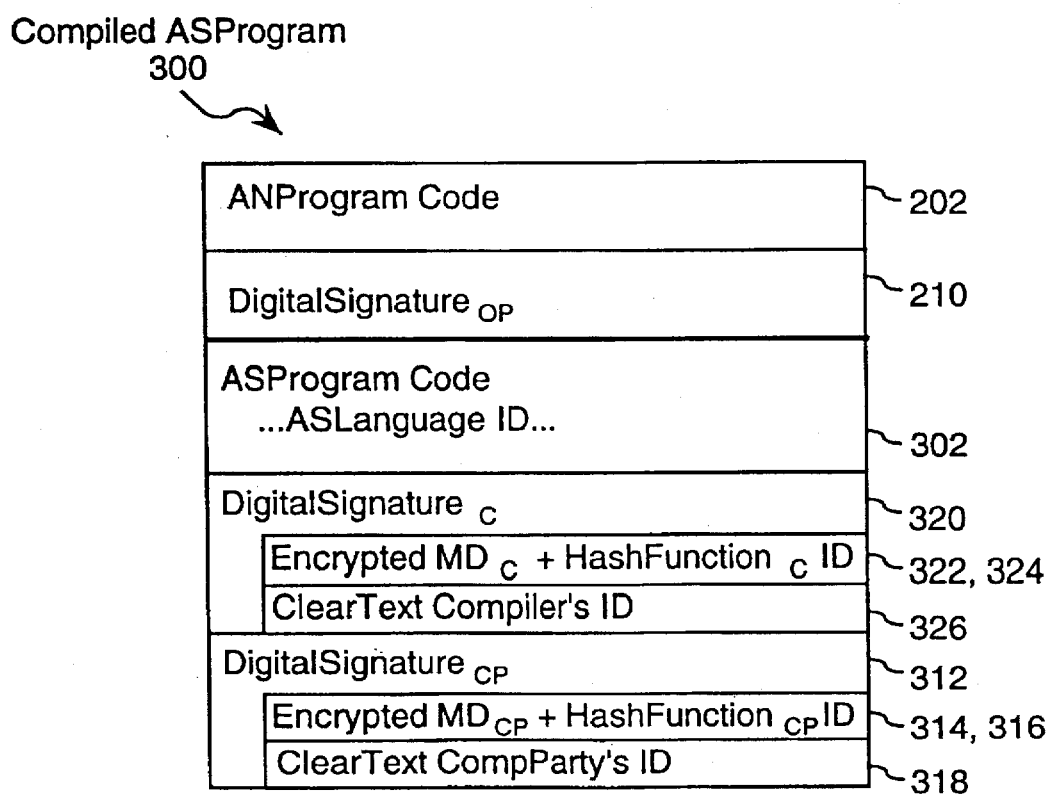
FIG. 3 depicts the structure of a compiled, architecture specific, program generated in accordance with a preferred embodiment of the present invention.

However, if the ANProgram code 202 of the received ANProgram 200 does satisfy the predefined integrity criteria, then the ANProgram integrity verifier 166 sends back a passed result to the ANProgram compiler 162. The ANProgram compiler then compiles the ANProgram code into the ASLanguage identified by the ASLanguage ID specified by the OrigParty. Referring now to FIGS. 1–3 and Table 2, the compiler places the ANProgram code 202, the $DigitalSignature_{OP}$ 210 and the compiled ASProgram code 302 in an ASProgram 300 that is stored in the ASProgram repository 172.

The ANProgram compiler 162 then calls the signature generator 168 and instructs it to generate the ANProgram compiler's digital signature ($DigitalSignature_c$) 320 which can be verified to ensure that the ASProgram 300 was compiled with the trusted ANProgram compiler. This is done in a manner similar to that described earlier for generating the $DigitalSignature_{OP}$. However, in this case, the set of information signed is the ASProgram code and the $DigitalSignature_{OP}$. Another predetermined hash function with a corresponding $HashFunction_C$ ID 324 may be used to generate the message digest $MD_C$ 322 of the sat of information to be signed by the $DigitalSignature_C$, the private encryption key of the ANProgram compiler (Compiler's PrivateKey) is used to encrypt the $MD_C$ and the $HashFunction_C$ ID, and the identifier of the ANProgram compiler (Compiler's ID) is added in clear text at the end of the encrypted $MD_c$ and $HashFunction_C$. The Compiler's PrivateKey and ID are provided by the ANProgram compiler.

The ANProgram compiler 162 calls the signature generator 168 a second time to generate the CompParty's digital signature ($DigitalSignature_{CP}$) 312, which can be verified by end users to ensure that the ASProgram 300 was generated by the trusted CompParty. This is done in a similar manner to that described earlier for generating the $DigtialSignature_{OP}$ (in the section discussing preparing an ANProgram for compiling). However, here the message digest ($MD_{CP}$) 314 generated for the $DigitalSignature_{CP}$ is generated by computing a predetermined or selected hash function ($HashFunction_{CP}$) on the data bits of the ASProgram code, the $DigitalSignatuer_{OP}$ and the $DigitalSignature_c$. Similar to the $HashFunction_{OP}$, for purposes of this disclosure, the $HashFunction_{CP}$ corresponds to the CompParty since it was used for the $DigitalSignature_{CP}$ of the CompParty.

The signature generator 168 then encrypts the $MD_{CP}$ 314 and the ID of the $HashFunction_{CP}$ ($HashFunction_{CP}$ ID) 316 with the private encryption key of the CompParty (CompParty's PrivateKey). The signature generator then adds the identifier of the CompParty (CompParty's ID) 318 in clear text at the end of the encrypted items 314 and 316 to form the $DigitalSignature_{CP}$ 312. The CompParty's PrivateKey and ID are provided by the CompParty with the user interface 152.

After the $DigitalSignature_C$ 320 and the $DigitalSignature_{CP}$ 312 are generated, the ANProgram compiler 162 appends them to the ASProgram code 302, so that the resulting compiled ASProgram file or object has the following components in it:

ANProgram Code, $DigitalSignature_{OP}$,

ASProgram Code, $DigitalSignature_C$, and $DigitalSignature_{CP}$.

Then, the ANProgrem compiler generates a message that the ANProgram 200 has been compiled to form the ASProgram 300 and is ready to be sent to the OrigParty.

The CompParty then uses the network communications manager 160 to transmit the ASProgram 300 to the OrigParty's client computer 102. The network communications manager does so by retrieving the ASProgram from the ASProgram repository 172 in which it is located and provides it to the network communications interface 156. The network communications manager than instructs the network communications interface to transmit the ASProgram to the OrigParty's client computer.

Object and Object Class Creation and Distribution

The transmitted ASProgram 300 is then received by the communications interface 116 of the OrigParty's client computer and instructs the network communications manager 120 that this has occurred. In response, the OrigParty issues a command with the user interface 252 to instruct the network communications manager to retrieve the received ASProgram from the network communications interface, causing the network communications manager to place the received ASProgram in the untrusted object class repository 142 of the OrigParty's client computer. Once this is done, the OrigParty may treat the received ASProgram as a new object class with just one method (i.e. the compiled program code), or it may create an object class that includes the ASProgram 300 as well as other ANPrograms and ASPrograms.

Figure 4:
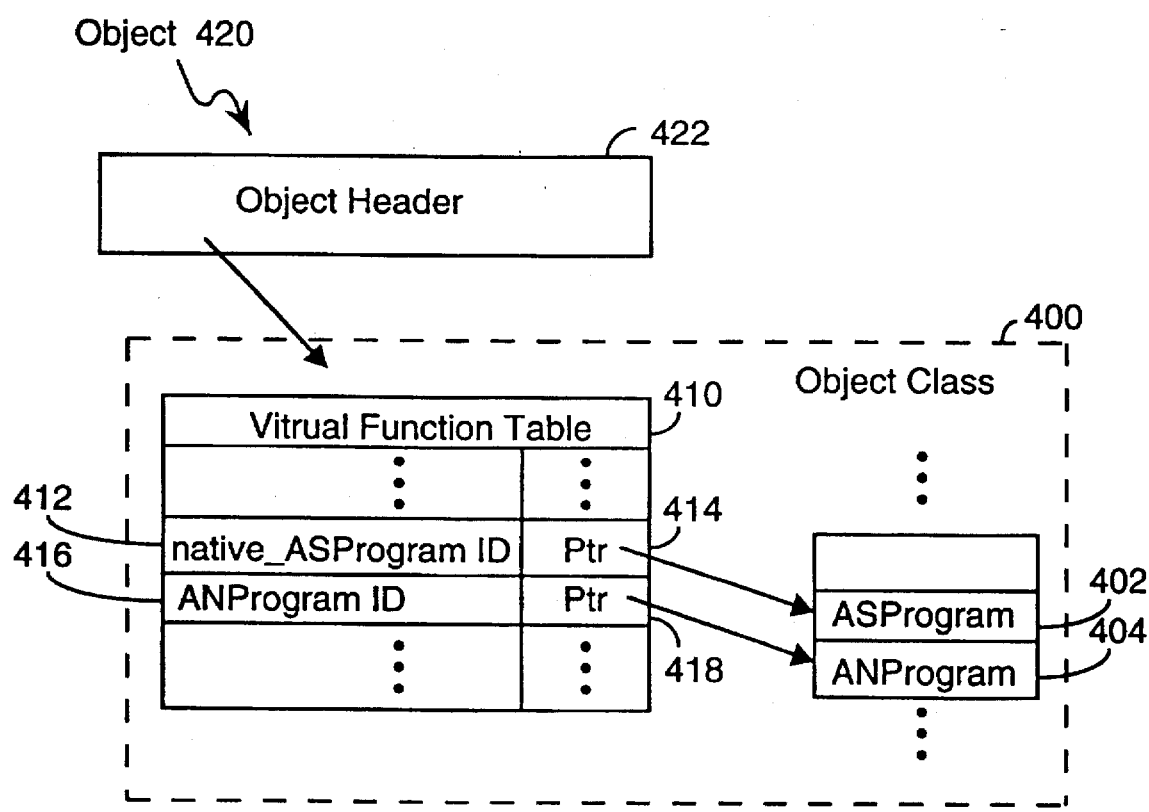
FIG. 4 depicts an object and associated object class in accordance with a preferred embodiment of the present invention.

FIG. 4 shows a typical object class 400 in accordance with the present invention. The object class may include one or more ASPrograms 402 and/or one or more ANPrograms 404, as well as a virtual function table 410. For each ASProgram, the virtual function table contains a corresponding identifier (native_ASProgram ID) 412 that indicates that it is an ASProgram (i.e., a native program) that is not in the ANLanguage and a corresponding pointer (Ptr) 414 to the native program. Similarly, for each ANProgram, the virtual function table contains a corresponding identifier (ANProgram ID) 416 and a corresponding pointer 418 to the ANProgrem. Every object 420 of this object class includes an object header 422 that points to the object class 400.

Thus, the OrigParty may create an object 420 and an object class 400 with the ASProgram 300 that was received from the server computer 104 as one of the ASPrograms 402 in the object class.

When the OrigParty wishes to distribute to various ExecuteParties an object and object class that includes the ASProgram 300 and ANProgram, then the OrigParty issues a command with the user interface 112 to instruct the network communications manager to transmit these items to the client computer 102 of the ExecuteParties. The network communications manager does this by retrieving them from the untrusted object class repository 142 in which they are located and provides them to the network communications interface 116 with apprOPriate transmission instructions. Alternately, the network communications manager of the OrigParty may respond to a request initiated by an ExecuteParty for a cOPy of a specified object class 400.

Execution of Architecture Neutral Programs and Architecture Specific Programs in an Object Class The network communications interface 156 of the client computer 102 receives the transmitted object and object class and instructs the network communications manager 160 that this has occurred. In response, the ExecuteParty issues a command with the user interface 112 to instruct the network communications manager to retrieve the received object and object class from the network communications interface. The network communications manager then stores the received object and object class in the untrusted object class repository 142.

The untrusted object class repository 142 of each client computer 102 contains the objects and their associated object classes that are not trusted. These object classes are not trusted because any ANPrograms they include have not yet had their integrity verified and any ASPrograms they include have not had their source verified nor have been verified as being compiled from the prOPer ANProgram.

The trusted object class repository 140 of each client computer contains the objects and their object classes that are trusted. These object classes are trusted because any ANPrograms they include may have already had their integrity verified by the ANProgmm integrity verifier 136 and any ASProgmms they contain have been ascertained to be trustworthy. In fact, some or all the object classes in the trusted object class repository 140 need not have digital signatures, because these object classes are trusted and therefore there is no reason to perform integrity checks on the methods in these object classes.

It is desirable to have an object class that primarily includes ANPrograms but may also include ASPrograms so that essentially all legitimate tasks can be performed with the object class, as suggested earlier. Therefore, the ANProgram executer 122 is capable of executing integrity verifiable ANPrograms and calling the ASProgram executer to execute integrity non-verifiable ASPrograms that are either (1) in trusted object classes in the trusted object class repository 140, or (2) that are in untrusted object classes in the untrusted object class repository 142 and have verifiable DigitalSignature$_{OP}$, DigitalSignature$_{CP}$ and DigitalSignature$_c$ information so that essentially all legitimate tasks can be performed. In this way, ASPrograms of untrusted object classes that don't have DigitalSignature$_{OP}$, DigitalSignature$_{CP}$ and DigitalSignature$_C$ information or whose digital signatures cannot be verified are prevented from being executed. Table 3 contains a pseudocode representation of the execution procedure used by the ANProgram executer.

Referring to FIGS. 1–4 and Table 3, at the client computer 102 of an ExecuteParty (e.g., the OrigParty or another party), the ANProgram executer 124 may be executing an ANProgram that seeks to call a method in a specified object class. The method call is initially handled by the object class loader 136, which determines whether or not the object class has already been loaded. If the object class has already been loaded into the ExecuteParty's user address space 138, then the ANProgram executer 122 executes the called method if the called method is an ANProgram and the ASProgram executer 124 executes the called method if the called method is an ASProgram.

However, if the object class has not yet been loaded into the ExecuteParty's address space 138, then the object class loader 136 loads the object class into the ExecuterParty's address space and determines whether or not execution of the called method is to be allowed. For instance, if the object class was loaded from the trusted object class repository 140, then execution of the called method is permitted and the Execute procedure is called. The Execute procedure (see Table 3) calls the ANProgram executer if the called method is an ANProgram, and otherwise calls the ASProgram executer 124 to execute the called method.

However, if the object class was loaded from the untrusted object class repository 142, the class loader 136 examines the object header of the object to determine if its object class includes any ASPrograms. It does so by determining if there any native_ASProgram IDs in the virtual function table of the object.

If there are no ASPrograms in the object class, then the class loader 136 calls the ANProgram integrity verifier 136 to verify the integrity of the ANPrograms in the object class. This is done in the same manner and for the same purpose as was described earlier for verifying the integrity of the ANProgram 200 (in the section discussing compiling an ANProgram). Thus, if the integrity of any of the ANPrograms is not verified, then the ANProgram integrity verifier passes back to the class loader a failed result and the class loader aborts the class loading procedure and generates an apprOPriate message indicating this. But, if the ANProgram integrity verifier sends back a passed result indicating that all of the ANPrograms of the object class are verified, the class loader enables execution of the called method.

If there are any ASPrograms in the object class, then the class loader 136 calls the signature verifier 132 to verify the compiler signature DigitalSignature$_c$ and the CompParty signature DigitalSignature$_{CP}$. If any of the ASProgrems does not include a DigitalSignature$_{CP}$ and a DigitalSignature$_c$, the integrity of the ASProgram's source cannot be verified and therefore the signature verifier sends back to the ANProgram executer a failed result. In response, the class loader aborts the object class loading procedure and generates an apprO-Priate message that this has occurred.

Further, if all of the ASPrograms in the object class do include a DigitalSignature$_{CP}$ and a DigitalSignature$_C$, the identities of the CompParty and the Compiler as indicated in these two digital signatures, are compared with the lists 144 (see FIG. 1) of known, trusted Compiler Parties and trusted Compilers. If any of the ASPrograms in the object class were compiled by a CompParty or a Compiler not included in the set of known, trusted Compiler Parties and trusted Compilers, the class loading procedure is aborted, and execution of the called method is thereby blocked. Similarly, if the ASLanguage identified in any of the ASPrograms does not match the ASLanguage used by the ASProgrem Executer 124, the class loading procedure is aborted.

However, if all of the ASPrograms in the object class do include a DigitalSignature$_{CP}$ and a DigitalSignature$_C$, and the identified CompParty and Compiler for all the ASPrograms are trusted Compiler Parties and Compilers, and the ASLanguage used by all the ASPrograms is one used by the ASProgram Executer, then the signature verifier verifies these signatures in a similar manner as was described earlier for verifying the DigitalSignature$_{OP}$ (in the section discussing compiling the ANProgram 200). However, in this case, the Compiler's and CompParty's public keys are retrieved from the trusted key repository 106 and respectively used to decrypt the MD$_c$ and HashFunction$_C$ ID in the DigitalSignature$_c$ and the MD$_{CP}$ and the HashFunction$_{CP}$ ID in the DigitalSignature$_{CP}$. Furthermore, the test message digests (TestMD$_C$ and TestMD$_{CP}$) corresponding to the decrypted MD$_{CP}$ and MD$_C$ are generated by computing hash codes on the data bits of the ASProgram code plus the DigitalSignature$_{OP}$ for the TestMD$_C$ and on the same data bits plus the DigitalSignature$_C$ for the TestMD$_{CP}$, according respectively to the HashFunction$_C$ and HashFunction$_{CP}$ identified by the decrypted HashFunction$_C$ ID and HashFunction$_{CP}$ ID.

If the DigitalSignature$_C$ and/or the DigitalSignature$_{CP}$ is not verified (i.e., MD$_C$≠TestMD$_C$ and/or MD$_{CP}$≠TestMD$_{CP}$) for every ASProgram, then the signature verifier 136 sends back to the class loader 136 a failed result. In response, the class loader aborts the class loading procedure and generates an apprOPriate message that this has occurred.

However, if the DigitalSignature$_C$ and the DigitalSignature$_{CP}$ are both verified (i.e., MD$_C$=TestMD$_C$ and MD$_{CP}$=TestMD$_{CP}$) for every ASProgram, then the ANProgram executer 124 again calls signature verifier 132 to verify the OrigParty's signatures (DigitalSignature$_{OP}$) for the ANPrograms from which the ASPrograms were compiled. To verify the OrigParty digital signatures, the DigitalSignature$_{OP}$ of each is verified in the same manner as was discussed earlier in the section concerning compilation of the ANProgram 200.

If the DigitalSignature$_{OP}$ of each of the ANPrograms from which the ASPrograms were compiled is verified, then the class loader calls the ANProgram integrity verifier to verify the integrity of every ANProgram in the object class and the ANPrograms from which the ASPrograms were compiled. This is done in the same manner as was described earlier. If the integrity of any of these ANPrograms is not verified, then the ANProgram integrity verifier sends back to the class loader a failed result, which aborts the class loading procedure and generates an apprOPriate message.

However, if the integrity of each of the ANPrograms is verified, then the ANProgram integrity verifier 126 sends back a passed result to the class loader 136. In response, the class loader invokes the ANProgram executer or ASProgram executer to execute the called method, as apprOPriate.

In view of the foregoing, the ExecuterParty is assured that only those untrusted object classes in the untrusted repository 142 that have integrity verifiable ANPrograms and ASPrograms whose digital signatures can be verified will be loaded and have their programs executed.

Alternative Embodiments

Some of the features of the invention described above are OPtional. Thus, those skilled in the art will recognize that alternative embodiments exist that don't include these features.

For example, the ANProgram compiler has been described as generating both a DigitalSignature$_{CP}$ and a DigitalSignature$_C$ respectively for the CompParty and the ANProgram compiler. However, the ANProgram compiler could be constructed simply to generate only one of these digital signatures for enabling verification of the either the compiler used to compile the ASProgram or the compiling party.

Similarly, the program executer has been described as requiring verification of both a DigitalSignature$_{CP}$ and a DigitalSignature$_C$. However, the program executer could be constructed to require verification of only one of these digital signatures and OPtionally verify the other digital signature if the ASProgram being verified includes it. Furthermore, the program executer could be constructed to skip the step of verifying the integrity of the ANProgram corresponding to each ASProgram, based on the assumption that the compiling party is trusted and that it is a duty of the compiling party to verify the integrity of each ANProgram that is compiles into an ASProgram prior to performing the compilation.

When the ExecuterParty is the OrigParty, the ExecuterParty knows that it actually sent the ANProgram 200 to the CompParty's server computer 104 to be compiled into the ASProgram 300. In this case, the class loader 136 could be constructed to not call the signature verifier to verify the DigtialSignature$_{OP}$ in the ANProgram. Rather, the ExecuterParty can simply compare the DigtialSignature$_{OP}$ in the local cOPy of the ANProgram with the DigtialSignature$_{OP}$ in the compiled ASProgram. Additionally, the class loader could be constructed to not call the ANProgram integrity verifier 126 to verify the integrity of the ANProgram corresponding to a called ASProgram since the integrity of the ANProgram would have been checked during the preparation for compiling procedure prior to being sent to the compiling server computer. Alternatively, the ANProgram compiling preparer 128 could be constructed to not call the ANProgram integrity verifier during the preparation for compiling procedure since its integrity would be checked both by the compiler and when the class loader calls the ANProgram integrity verifier prior to execution of the corresponding ASProgram.

While the present invention has been described with reference to a few specific embodiments, the description is illustrative of the invention and is not to be construed as limiting the invention. Various modifications may occur to those skilled in the art without departing from the true spirit and scOPe of the invention as defined by the appended claims.

TABLE 1

Pseudocode Representation of Method of Preparing Architecture Neutral Program for Compiling Procedure: Prepare for Compiling (ANProgram code, OrigParty's Privatekey, and OrigParty's ID)
{
Verify integrity of ANProgram with ANProgram integrity verifier
If failed result
    { abort and generate failed result message }
Generate MD$_{OP}$ = HashFunction$_{OP}$ (ANProgram code)
Generate DigitalSignature$_{OP}$ = Encrypt (MD$_{OP}$ + HashFunction$_{OP}$ ID, OrigParty's PrivateKey) + ClearText (OrigParty's ID)
Append DigitalSignature$_{OP}$ to ANProgram code
Generate message that ANProgram is prepared for compiling
Return
}

TABLE 2

Pseudocode, Representation of Method of Compiling ANProgram and Generating ASProgram Procedure: Compile (ANProgram, CompParty's ID, ASLanguageID, CompParty's PrivateKey, Compiler's ID, and Compiler's PrivateKey)
{
Retrieve OrigParty's PublicKey from trusted key repository using ClearText OrigParty's ID in DigitalSignature$_{OP}$
Decrypt (MD$_{OP}$ + HashFunction$_{OP}$ ID in DigitalSignature$_{OP}$, OrigParty's PublicKey)
Generate TestMD$_{OP}$ = HashFunction$_{OP}$ (ANProgram code) using HashFunction$_{OP}$ identified by decrypted HashFunction$_{OP}$ ID
Compare decrypted MD$_{OP}$ and TestMD$_{OP}$

TABLE 2-continued

Pseudocode, Representation of Method of Compiling ANProgram and Generating ASProgram

```
If decrypted MD_OP ≠ TestMD_OP
    {
    /* DigitalSignature_OP of OrigParty not verified */
    Generate failed result message
    }
Else
    {
    /* DigitalSignature_OP of OrigParty has been verified */
    Verify integrity of ANProgram with ANProgram integrity verifier
    If failed result
        {
        abort and generate failed result message
        }
    Else
        {
        /* ANProgram has been verified */
        Compile ANProgram code into ASLanguage identified by
            ASLanguage ID to generate ASProgram code
        Generate MD_C = HashFunction_CS (ASProgram code +
            DigitalSignature_OP)
        Generate DigitalSignature_C = Encrypt (MD_C +
            HashFunction_C ID, ANProgrom Compiler's
            PrivateKey) + ClearText ANProgram Compiler's ID
        Generate MD_CP = HashFunction_CP (ASProgram code +
            DigitalSignature_OP + DigitalSignature_C)
        Generate DigitalSignature_CP = Encrypt (MD_CP +
            HashFunction_CP ID, CompParty's PrivateKey) +
            ClearText CompParty's ID
        Generate and Return File or Object containing:
            ANProgram Code,
            DigitalSignature_OP,
            ASProgram Code,
            DigitalSignature_C, and
            DigitalSignature_CP
        /* ASProgram has been compiled and generated */
        }
    }
}
```

TABLE 3

Pseudocode Representation of Method of Executing Architecture Specific Program

```
Procedure: Execute (ObjectClass, Program)
{
If the Program is a verifiable program
    { Execute Program using the Bytecode Interpreter }
Else
    { Execute Program using the compiled program executer }
}
Procedure: ClassLoad (ObjectClass, Program)
{
If Object Class has already been loaded into ExecuterParty's address
    space
    {
    Call Execute (ObjectClass, Program)
    Return
    }
/* The Object Class has not been loaded */
Load Object Class into ExecuterParty's address space
If Object Class was loaded from Trusted Object Class Repository
    {
    Call Execute (ObjectClass, Program)
    Return
    }
/* Object Class was loaded from Untrusted Object Class Repository */
If Object Class does not contain any ASPrograms designated as
    native_ASPrograms in Object Header of Object
    {
    Verify integrity of all ANPrograms of Object Class with ANProgram
        integrity verifier
    If failed result
```

TABLE 3-continued

Pseudocode Representation of Method of Executing Architecture Specific Program

```
        {
        Abort with appropriate failed result message
        }
    Else
        */ Integrity of all ANPrograms of Object Class have been verified
        */
        { Call Execute (ObjectClass, Program) }
    Return
    }
*/ Object Class does contain ASPrograms designated as
    native_ASPrograms in Object Header of Object */
If any ASProgram does not contain a DigitalSignature_CP and a
    DigitalSignature_C
    {
    /* Compiling Party and Compiler of every ASProgram cannot be
        verified */
    Generate appropriate message
    Return
    }
For each ASProgram in Object Class:
    { Determine identity of CompParty and Compiler and determine
        ASLanguage used by ASProgram }
If identity of CompParty for any ASProgram is not a known, trusted,
    Compiling Party, or the identity of Compiler is not a known, trusted
    Compiler, or the identified ASLanguage is not one used by the
    ASProgram Executer
    {
    Generate appropriate message
    Return
    }
For each ASProgram in Object Class:
    {
    Retrieve CompParty's PublicKey from trusted key repository using
        ClearText CompParty's ID in DigitalSignature_CP
    Decrypt (MD_CP + HashFunction_CP ID in DigitalSignature_CP,
        CompParty's PublicKey)
    Generate TestMD_CP HashFunction_CP (ASProgram code +
        DigitalSignature_OP + DigitalSignature_C in ASProgram) using
        HashFunction_CP identified by decrypted HashFunction_CP ID
    Compare decrypted MD_CP and TestMD_CP
    }
If decrypted MD_CP ≠ TestMD_CP for any ASProgram
    {
    /* DigitalSignature_CP for every ASProgram has not been verified */
    Generate appropriate failed result message
    Return
    }
/* DigitalSignature_CP for every ASProgram has been verified*/
For each ASProgram in Object Class:
    {
    Retrieve ANProgram Compiler's Publickey from trusted key
        repository using ClearText ANProgram Compiler's ID in
        DigitalSignature_C
    Decrypt (MD_C + HashFunction_C ID in DigitalSignature_C, ANProgram
        Compiler's PublicKey)
    Generate TestMD_C = HashFunction_C (ASProgram code +
        DigitalSignature_OP) using HashFunction_C identified by decrypted
        HashFunction_C ID
    Compare decrypted MD_C and TestMD_C
    }
If decrypted MD_C ≠ TestMD_C for any ASProgram
    {
    /* DigitalSignature_C for every ASProgram in Object Class has not
        been verified */
    Generate appropriate failed result message
    Return
    }
/* DigitalSignature_C for every ASProgram in Object Class has been
    verified */
For each ANProgram from which an ASProgram in Object Class was
    compiled:
    {
    Retrieve OrigParty's PublicKey from trusted key repository using
        ClearText OrigParty's ID in DigitalSignature_OP
    Decrypt (MD_OP + HashFunction_OP ID in DigitalSignature_OP,
        OrigParty's PublicKey)
```

TABLE 3-continued

Pseudocode Representation of Method of Executing
Architecture Specific Program

```
    Generate TestMD_OP = HashFunction_OP (ANProgram code) using
      HashFunction_OP identified by decrypted HashFunction_OP ID
    Compare decrypted MD_OP and TestMD_OP
    }
  If decrypted MD_OP ≠ TestMD_OP for any ANProgram
    {
    /* DigitalSignature_OP for every ANProgram from which an
      ASProgram in Object Class was compiled not verified */
    Generate failed result message
    Return
    }
  /* The DigitalSignature_OP in every ASProgram in Object Class is
    verified */
  Verify integrity of ANPrograms in Object class and ANPrograms from
    which ASPrograms in Object Class were compiled with ANProgram
    integrity verifier
  If failed result
    {
    Generate failed result message
    Return
    }
  */ Integrity of all ANPrograms in Object class and all ANPrograms
    from which ASPrograms in Object Class were compiled have been
    verified */
  Call Execute (ObjectClass, Program)
  }
```

What is claimed is:

1. A computer comprising:

a program integrity verifier that verifies that programs written in an architecture neutral language satisfy predefined program integrity criteria;

a digital signature verifier that verifies the digital signatures of originating parties of programs that are contained in the programs;

an untrusted object class repository that stores untrusted object classes;

a trusted object class repository that stores trusted object classes;

said object classes each including at least one program, each program comprising a program selected from the group consisting of (A) architecture neutral programs written in the architecture neutral language and (B) architecture specific programs written in an architecture specific language whose integrity cannot be verified by the integrity verifier;

an architecture specific program executer;

an architecture neutral program executer;

a user address space; and a class loader that loads a specified one of said object classes into the user address space for execution when execution of any program in the one object class is requested, said class loader including program security logic for preventing the loading of any requested object class, other than object classes in said trusted object class repository, that includes at least one architecture specific program unless every architecture specific program in the requested object class includes a digital signature and said digital signature is successfully verified by said digital signature verifier.

2. The computer of claim 1, said class loader includes verifier logic for invoking said program integrity verifier to verify the integrity of every architecture neutral program in the requested object class when the requested object class is not stored in said trusted object class repository and includes at least one architecture neutral program; said program security logic further preventing the loading of said any requested object class other than object classes in said trusted object class repository when the requested object class includes at least one architecture neutral program whose integrity is not verified by said program integrity verifier.

3. The computer of claim 2, said class loader further enabling execution of the requested program by said architecture neutral program executer when said requested program is an architecture neutral program and loading of the requested object class is not prevented by said program security logic, and enabling execution of the requested program by said architecture specific program executer when said requested program is an architecture specific program and loading of the requested object class is not prevented by said program security logic.

4. The computer of claim 1, each said digital signature associated with one of said architecture specific programs including a signing party identifier and an encrypted message, said encrypted message including a message digest of the architecture specific program generated using a message digest function wherein said encrypted message has been encrypted using a private encryption key associated with said identified signing party; and said digital signature verifier including logic for processing a specified digital signature by obtaining a public key associated with the signing party identified by said signing party identifier, decrypting the encrypted message of said digital signature with said public key so as generate a decrypted message digest, generating a test message digest by executing said message digest function on the architecture specific program associated with said digital signature, comparing said test message digest with said decrypted message digest, and issuing a failure signal if said decrypted message digest and test message digest do not match.

5. The computer of claim 1, each said digital signature associated with one of said architecture specific programs including a signing party identifier and an encrypted message, said encrypted message including a message generated by a predefined procedure, wherein said encrypted message has been encrypted using a private encryption key associated with said identified signing party; and said digital signature verifier including logic for processing a specified digital signature by obtaining a public key associated with the signing party identified by said signing party identifier, decrypting the encrypted message of said digital signature with said public key so as generate a decrypted message, generating a test message by executing said predefined procedure on the architecture specific program associated with said digital signature, comparing said test message with said decrypted message, and issuing a failure signal if said decrypted message digest and test message digest do not match.

6. The computer of claim 1, said program security logic further for preventing the loading of any requested object class, other than object classes in said trusted object class repository, that includes at least one architecture specific program unless every architecture specific program in the requested object class includes two digital signatures and said digital signatures are both successfully verified by said digital signature verifier;

each said digital signature associated with one of said architecture specific programs including a signing party identifier and an encrypted message, said encrypted message including a message generated by a predefined procedure, wherein said encrypted message has been encrypted using a private encryption key associated with said identified signing party;

said digital signature verifier including logic for processing a specified digital signature by obtaining a public key associated with the signing party identified by said signing party identifier, decrypting the encrypted message of said digital signature with said public key so as generate a decrypted message, generating a test message by executing said predefined procedure on the architecture specific program associated with said digital signature, comparing said test message with said decrypted message, and issuing a failure signal if said decrypted message digest and test message digest do not match; and said program security logic preventing loading of the requested object class, other than object classes in said trusted object class repository, unless every architecture specific program in the requested object class includes a first digital signature for which the signing party is a member of a first group of trusted parties, and includes a second digital signature for which the signing party is a member of a second group of trusted parties.

7. The computer of claim 1, said program security logic preventing loading of the requested object class, other than object classes in said trusted object class repository, unless every architecture specific program in the requested object class includes a message digest for an associated architecture neutral program, and said message digest matches a test message digest generated by said program security logic by performing a predefined message digest procedure on said associated architecture neutral program.

8. A method of OPerating a computer system, comprising the steps of:

storing untrusted object classes in an untrusted object class repository;

storing trusted object classes in a trusted object class repository;

said object classes each including at least one program, each program comprising a program selected from the group consisting of (A) architecture neutral programs written in an architecture neutral language and (B) architecture specific programs written in an architecture specific language;

when execution of any program in the one object class is requested, loading the requested object class into a user address space for execution unless loading of the requested object class is prevented by a security violation, including preventing the loading of any requested object class, other than object classes in said trusted object class repository, that includes at least one architecture specific program unless every architecture specific program in the requested object class includes a digital signature and said digital signature is successfully verified by said digital signature verifier.

9. The method of claim 8, said object class loading step including (A) verifying the integrity of every architecture neutral program in the requested object class when the requested object class is not stored in said trusted object class repository and includes at least one architecture neutral program, and (B) and preventing the loading of the requested object class, unless the requested object class is in said trusted object class repository, when the requested object class includes at least one architecture neutral program whose integrity is not verified.

10. The method of claim 9, said object class loading step including enabling execution of the requested program by said architecture neutral program executer when said requested program is an architecture neutral program and loading of the requested object class is not prevented by said program security logic, and enabling execution of the requested program by said architecture specific program executer when said requested program is an architecture specific program and loading of the requested object class is not prevented by said program security logic.

11. The method of claim 8, each said digital signature associated with one of said architecture specific programs including a signing party identifier and an encrypted message, said encrypted message including a message digest of the architecture specific program generated using a message digest function wherein said encrypted message has been encrypted using a private encryption key associated with said identified signing party; and said object class loading step including processing a specified digital signature by obtaining a public key associated with the signing party identified by said signing party identifier, decrypting the encrypted message of said digital signature with said public key so as generate a decrypted message digest, generating a test message digest by executing said message digest function on the architecture specific program associated with said digital signature, comparing said test message digest with said decrypted message digest, and issuing a failure signal if said decrypted message digest and test message digest do not match.

12. The method of claim 8, each said digital signature associated with one of said architecture specific programs including a signing party identifier and an encrypted message, said encrypted message including a message generated by a predefined procedure, wherein said encrypted message has been encrypted using a private encryption key associated with said identified signing party; and said object class loading step including processing a specified digital signature by obtaining a public key associated with the signing party identified by said signing party identifier, decrypting the encrypted message of said digital signature with said public key so as generate a decrypted message, generating a test message by executing said predefined procedure on the architecture specific program associated with said digital signature, comparing said test message with said decrypted message, and issuing a failure signal if said decrypted message digest and test message digest do not match.

13. The method of claim 8, object class loading step including preventing the loading of any requested object class, other than object classes in said trusted object class repository, that includes at least one architecture specific program unless every architecture specific program in the requested object class includes two digital signatures and said digital signatures are both successfully verified by said digital signature verifier;

each said digital signature associated with one of said architecture specific programs including a signing party identifier and an encrypted message, said encrypted message including a message generated by a predefined procedure, wherein said encrypted message has been encrypted using a private encryption key associated with said identified signing party;

said object class loading step including processing a specified digital signature by obtaining a public key associated with the signing party identified by said signing party identifier, decrypting the encrypted message of said digital signature with said public key so as generate a decrypted message, generating a test message by executing said predefined procedure on the architecture specific program associated with said digital signature, comparing said test message with said decrypted message, and issuing a failure signal if said decrypted message digest and test message digest do not match;

said object class loading step further including preventing loading of the requested object class, other than object classes in said trusted object class repository, unless every architecture specific program in the requested object class includes a first digital signature for which the signing party is a member of a first group of trusted parties, and includes a second digital signature for which the signing party is a member of a second group of trusted parties.

14. The method of claim 8, said object class loading step including preventing loading of the requested object class, other than object classes in said trusted object class repository, unless every architecture specific program in the requested object class includes a message digest for an associated architecture neutral program, and said message digest matches a test message digest generated by said program security logic by performing a predefined message digest procedure on said associated architecture neutral program.

15. A memory for storing data programs being executed on a data processing system, said memory comprising:

a program integrity verifier that verifies that programs written in an architecture neutral language satisfy predefined program integrity criteria;

a digital signature verifier that verifies the digital signatures of originating parties of programs that are contained in the programs;

an untrusted object class repository that stores untrusted object classes;

a trusted object class repository that stores trusted object classes;

said object classes each including at least one program, each program comprising a program selected from the group consisting of (A) architecture neutral programs written in the architecture neutral language and (B) architecture specific programs written in an architecture specific language whose integrity cannot be verified by the integrity verifier;

an architecture specific program executer;

an architecture neutral program executer; and a class loader that loads a specified one of said object classes into a user address space for execution when execution of any program in the one object class is requested, said class loader including program security instructions for preventing the loading of any requested object class, other than object classes in said trusted object class repository, that includes at least one architecture specific program unless every architecture specific program in the requested object class includes a digital signature and said digital signature is successfully verified by said digital signature verifier.

16. The memory of claim 15, said class loader includes verifier instructions for invoking said program integrity verifier to verify the integrity of every architecture neutral program in the requested object class when the requested object class is not stored in said trusted object class repository and includes at least one architecture neutral program;

said program security instructions further preventing the loading of said any requested object class other than object classes in said trusted object class repository when the requested object class includes at least one architecture neutral program whose integrity is not verified by said program integrity verifier.

17. The memory of claim 16, said class loader further enabling execution of the requested program by said architecture neutral program executer when said requested program is an architecture neutral program and loading of the requested object class is not prevented by said program security instructions, and enabling execution of the requested program by said architecture specific program executer when said requested program is an architecture specific program and loading of the requested object class is not prevented by said program security instructions.

18. The memory of claim 15, each said digital signature associated with one of said architecture specific programs including a signing party identifier and an encrypted message, said encrypted message including a message digest of the architecture specific program generated using a message digest function wherein said encrypted message has been encrypted using a private encryption key associated with said identified signing party; and said digital signature verifier including instructions for processing a specified digital signature by obtaining a public key associated with the signing party identified by said signing party identifier, decrypting the encrypted message of said digital signature with said public key so as generate a decrypted message digest, generating a test message digest by executing said message digest function on the architecture specific program associated with said digital signature, comparing said test message digest with said decrypted message digest, and issuing a failure signal if said decrypted message digest and test message digest do not match.

19. The memory of claim 15, each said digital signature associated with one of said architecture specific programs including a signing party identifier and an encrypted message, said encrypted message including a message generated by a predefined procedure, wherein said encrypted message has been encrypted using a private encryption key associated with said identified signing party; and said digital signature verifier including instructions for processing a specified digital signature by obtaining a public key associated with the signing party identified by said signing party identifier, decrypting the encrypted message of said digital signature with said public key so as generate a decrypted message, generating a test message by executing said predefined procedure on the architecture specific program associated with said digital signature, comparing said test message with said decrypted message, and issuing a failure signal if said decrypted message digest and test message digest do not match.

20. The memory of claim 15, said program security instructions further for preventing the loading of any requested object class, other than object classes in said trusted object class repository, that includes at least one architecture specific program unless every architecture specific program in the requested object class includes two digital signatures and said digital signatures are both successfully verified by said digital signature verifier;

each said digital signature associated with one of said architecture specific programs including a signing party identifier and an encrypted message, said encrypted message including a message generated by a predefined procedure, wherein said encrypted message has been encrypted using a private encryption key associated with said identified signing party;

said digital signature verifier including instructions for processing a specified digital signature by obtaining a public key associated with the signing party identified by said signing party identifier, decrypting the encrypted message of said digital signature with said public key so as generate a decrypted message, generating a test message by executing said predefined procedure on the architecture specific program associated with said digital signature, comparing said test message with said decrypted message, and issuing a failure signal if said decrypted message digest and test message digest do not match; and said program security instructions preventing loading of the requested object class, other than object classes in said trusted object class repository, unless every architecture specific program in the requested object class includes a first digital signature for which the signing party is a member of a first group of trusted parties, and includes a second digital signature for which the signing party is a member of a second group of trusted parties.

21. The memory of claim 15, said program security instructions preventing loading of the requested object class, other than object classes in said trusted object class repository, unless every architecture specific program in the requested object class includes a message digest for an associated architecture neutral program, and said message digest matches a test message digest generated by said program security instructions by performing a predefined message digest procedure on said associated architecture neutral program.

* * * * *

UNITED STATES PATENT AND TRADEMARK OFFICE
CERTIFICATE OF CORRECTION

PATENT NO.     : 5,692,047                                  Page 1 of 1
DATED          : November 25, 1997
INVENTOR(S)    : Charles E. McManis It is certified that error appears in the above-identified patent and that said Letters Patent is hereby corrected as shown below:

Column 15,
Line 44, replace "wdtten" with -- written --;

Column 16,
Lines 31 and 51, after "so as", insert -- to --;

Column 17,
Line 12, after "so as", insert -- to --;
Line 39, replace "OPerating" with -- operating --;

Column 18,
Lines 28 and 49, after "so as", insert -- to --;

Column 19,
Line 10, after "so as", insert -- to --;

Column 20,
Lines 41 and 63, after "so as", insert -- to --;

Column 21,
Line 24, after "so as", insert -- to --;

Signed and Sealed this

First Day of April, 2003

JAMES E. ROGAN
*Director of the United States Patent and Trademark Office*